United States Patent
Godefroy et al.

(10) Patent No.: US 8,022,707 B2
(45) Date of Patent: Sep. 20, 2011

(54) METHODS AND APPARATUS FOR DETERMINING A PRESENCE OF A NON-CONDUCTIVE COATING ON ELECTRODES IN DOWNHOLE FLUID RESISTIVITY MEASUREMENT DEVICES

(75) Inventors: Sophie Godefroy, Kawasaki (JP); Michael O'Keefe, Blackmans Bay (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 527 days.

(21) Appl. No.: 12/165,580

(22) Filed: Jun. 30, 2008

(65) Prior Publication Data

US 2009/0322338 A1    Dec. 31, 2009

(51) Int. Cl.
*G01V 3/02* (2006.01)
*G01V 3/08* (2006.01)

(52) U.S. Cl. ................ 324/347; 324/354
(58) Field of Classification Search ............ 324/323, 324/324, 347, 354, 355, 357, 358, 366, 367, 324/442, 444; 702/6, 7; 73/152.18, 861.08; 175/50; 166/65.1

See application file for complete search history.

(56) References Cited

U.S. PATENT DOCUMENTS

| 7,183,778 | B2 | 2/2007 | Homan |
| 7,716,978 | B2 * | 5/2010 | Tchakarov et al. ........ 73/152.18 |
| 2005/0179437 | A1 * | 8/2005 | Hayman et al. ............... 324/347 |

* cited by examiner

*Primary Examiner* — Kenneth J Whittington
(74) *Attorney, Agent, or Firm* — Daryl Wright; Jody DeStefanis; Jeff Griffin (57) ABSTRACT

Methods and apparatus for determining a presence of a non-conductive coating on electrodes in fluid resistivity measurement devices are described. An example method of determining a presence of a non-conductive coating on electrodes of a fluid resistivity measurement device involves obtaining a first electrical potential value associated with a substantially uncoated condition of first and second electrodes of a fluid resistivity measurement device. The example method also involves measuring a second electrical potential value at a location between the first and second electrodes, comparing the first and second electrical potential values, and determining the presence of a non-conductive coating on at least one of the first and second electrodes based on the comparison.

26 Claims, 6 Drawing Sheets

METHODS AND APPARATUS FOR DETERMINING A PRESENCE OF A NON-CONDUCTIVE COATING ON ELECTRODES IN DOWNHOLE FLUID RESISTIVITY MEASUREMENT DEVICES

FIELD OF THE DISCLOSURE

This disclosure relates generally to sampling and analyzing formation fluids and, more particularly, to methods and apparatus for determining a presence of a non-conductive coating on electrodes in downhole fluid resistivity measurement devices.

BACKGROUND

Downhole fluid analysis is often used to provide information in real time about the composition of subterranean formation or reservoir fluids. Such real-time information can be advantageously used to improve or optimize the effectiveness of formation testing tools during a sampling processes in a given well (e.g., downhole fluid composition analysis allows for reducing and/or optimizing the number of samples captured and brought back to the surface for farther analysis). More generally, collecting accurate data about the characteristics of formation fluid(s) is an important aspect of making reliable predictions about a formation or reservoir and, thus, can have a significant impact on reservoir performance (e.g., production quality, volume, efficiency, etc.).

Fluid characteristics such as composition, density, viscosity, formation water or formation fluid resistivity, etc. are typically measured using formation fluid testers that are deployed via wireline tools and/or logging-while-drilling (LWD) tools, both types of which are commonly available. Formation fluid testers often use sensors that are in-line with a flowline of a formation fluid tester portion of a wireline or LWD tool and which may be at least partially in contact with or exposed to fluid(s) in the flowline.

Formation fluid resistivity is an important formation fluid characteristic because fluid resistivity characteristics can be advantageously used or applied in many ways. For example, formation fluid resistivity measurements can be used to determine formation water resistivity (Rw) which, in turn, can be used for petrophysical analysis of a formation. Also, for example, resistivity measurements can be used to determine the injection or formation water in water flood carbonates, determine whether carbonate transition zones have been invaded by formation water or water-based mud (WBM), determine salinity, quantify the level of WBM contamination, and/or perform a robust downhole fluid analysis at high temperature and high pressure.

Fluid resistivity measurement devices typically use either a direct measurement technique or an inductive measurement technique. Inductive fluid resistivity measurement devices induce a current in a portion of a flowline. In particular, inductive resistivity measurement devices typically employ two electrodes that are spaced along the flowline and are electrically insulated from each other (e.g., by an insulator or otherwise electrically insulated portion of the flowline). However, as is the case with many flowline sensors or measurement devices, the electrodes of an inductive resistivity measurement device are in direct contact with the fluid(s) flowing in the flowline. As a result, over time, one or both of the electrodes can become at least partially coated by substantially electrically insulating (i.e., substantially non-conductive) fluid(s) such as, for example, WBM, oil, etc. If one or both electrodes become contaminated with such non-conductive coatings, the resistivity measurements made by resistivity measurement device are biased or inaccurate.

SUMMARY

An example method of determining a presence of a non-conductive coating on electrodes of a fluid resistivity measurement device involves obtaining a first electrical potential value associated with a substantially uncoated condition of first and second electrodes of a fluid resistivity measurement device, measuring a second electrical potential value at a location between the first and second electrodes, comparing the first and second electrical potential values, and determining the presence of a non-conductive coating on at least one of the first and second electrodes based on the comparison.

Another example method of determining a presence of a non-conductive coating on an electrode of a fluid resistivity measurement device involves measuring an electrical parameter value at a location between first and second electrodes of a fluid resistivity measurement device, comparing the measured electrical parameter value to a second electrical parameter value, and determining the presence of a non-conductive coating on at least one of the first and second electrodes based on the comparison.

An example apparatus to determine a presence of a non-conductive coating on an? electrode of a fluid resistivity measurement device includes an electrical parameter measurement unit to measure an electrical parameter value at a location between first and second electrodes of a fluid resistivity measurement device, a comparison unit to compare the measured electrical parameter value to a second electrical parameter value, and a non-conductive coating presence detection unit to determine the presence of a non-conductive coating on at least one of the first and second electrodes based on an output of the comparison unit.

DETAILED DESCRIPTION

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness.

Accurate analysis of formation fluid samples is a crucial aspect of efficiently producing a formation. In particular, the selection of a proper or best production methodology often depends on the results of a fluid analysis. As a result, proper calibration and/or maintenance of downhole fluid analyzers or sensors is crucial to ensuring that fluid analysis results are accurate and, ultimately, that formation fluids are produced in the most effective and efficient manners.

As noted above, accurate fluid resistivity measurements are especially important to developing an accurate understanding of the characteristics of a formation and/or the fluids that can be produced therefrom. The example methods and apparatus described herein may be used to determine or detect the presence of substantially electrically insulating or substantially non-conductive coatings on one or more electrodes of a fluid resistivity measurement device of a downhole tool. Detecting the presence of such non-conductive coatings on the electrodes of a fluid resistivity measurement device advantageously enables, for example, an operator or other person to be warned that any measurements made thereby may be inaccurate and/or prompting the operator or other person to initiate maintenance (e.g., cleaning or replacement) of the electrodes to ensure that only sufficiently accurate fluid resistivity measurements are used to adjust or control the testing and/or production operations associated with a formation.

In general, the example methods and apparatus described herein determine the presence of a substantially insulating or non-conductive coating on one or more electrodes of a fluid resistivity measurement device by detecting a change in an electrical parameter value (e.g., an electrical potential value such as a voltage value) of the fluid resistivity measurement device. In one example implementation, a first, reference, or expected electrical parameter value (e.g., an electrical potential value such as a voltage) associated with a substantially uncoated condition of first and second electrodes of a fluid resistivity measurement device is obtained (e.g., calculated, measured, etc.). Then, during use of the fluid resistivity device, a second electrical parameter value (e.g., a second electrical potential value) is measured and compared to the first or reference electrical parameter value. If the comparison of (e.g., the difference between) the second measured electrical parameter value and the first or reference electrical parameter value exceeds a predetermined value or threshold, the presence of a substantially insulating or non-conductive coating is likely and the presence of the same may be indicated (e.g., to an operator).

More specifically, the example methods and apparatus may be adapted for use with an inductive type fluid resistivity measurement device having two or more symmetric or asymmetric electrodes that are spaced along a flowline and electrically insulated from each other by at least one insulator along the flowline. Thus, the insulator or insulating portion of the flowline is generally disposed between the electrodes. The example methods and apparatus may be used to measure an electrical potential (e.g., a voltage) at a location along the length of the insulator or insulating portion of the flowline (i.e., a location between the electrodes). For any given location along the insulator, conductive condition of the electrodes, and excitation potential applied to the electrodes, a corresponding electrical potential is present at the measurement location between the electrodes. Thus, for a fixed measurement location and excitation potential, any change in the conductive condition of the electrodes results in a corresponding change in the electrical potential measured at the location on the insulator. In particular, by measuring or otherwise determining the electrical potential (e.g., a reference potential) at the location along the insulator when the electrodes are in a known or substantially uncoated condition (i.e., substantially free of any insulating or non-conductive coatings) and subsequently monitoring or measuring the electrical potential over time or use, the presence of a non-conductive coating on one or more of the electrodes can be determined or detected via a change in the measured electrical potential relative to the reference electrical potential.

In example implementations where the electrodes of the fluid resistivity measurement device are symmetrical relative to each other and the mid-point along the insulator between the electrodes is used as an electrical potential measuring or monitoring point, the electrical potential is substantially zero (e.g., an electrical null point) when the electrodes are in an uncoated condition (i.e., substantially free of insulating or non-conductive contaminant coatings). If a non-conductive coating accumulates on one or both of the electrodes (in a non-symmetric manner, which is usually the case), the electrical potential at the mid-point will become substantially non-zero.

In example implementations where the electrodes of the fluid resistivity measurement device are asymmetrical relative to each other and the mid-point along the insulator between the electrodes is used as an electrical potential measuring or monitoring location, the electrical potential value is substantially non-zero when the electrodes are in an uncoated condition. In other words, the reference electrical potential is a non-zero value. However, if a non-conductive coating accumulates on one or both of the electrodes, the electrical potential at the measuring or monitoring location will change from the reference potential and, thus, enable the detection of the non-conductive coating.

More generally, any location along the insulator or insulating flowline portion between the electrodes of an inductive fluid resistivity measurement device may be used as a measuring or monitoring location. That is, measuring, calculating, or otherwise obtaining the electrical potential at the measuring or monitoring location when the electrodes are in a known clean condition (i.e., uncoated or substantially free from insulating or non-conductive coatings) and then making subsequent measurements at that location over time to detect a change in the measured electrical potential at the measuring or monitoring location enables a determination that a coating may be present on one or more of the electrodes of the resistivity measurement device.

Figure 1:
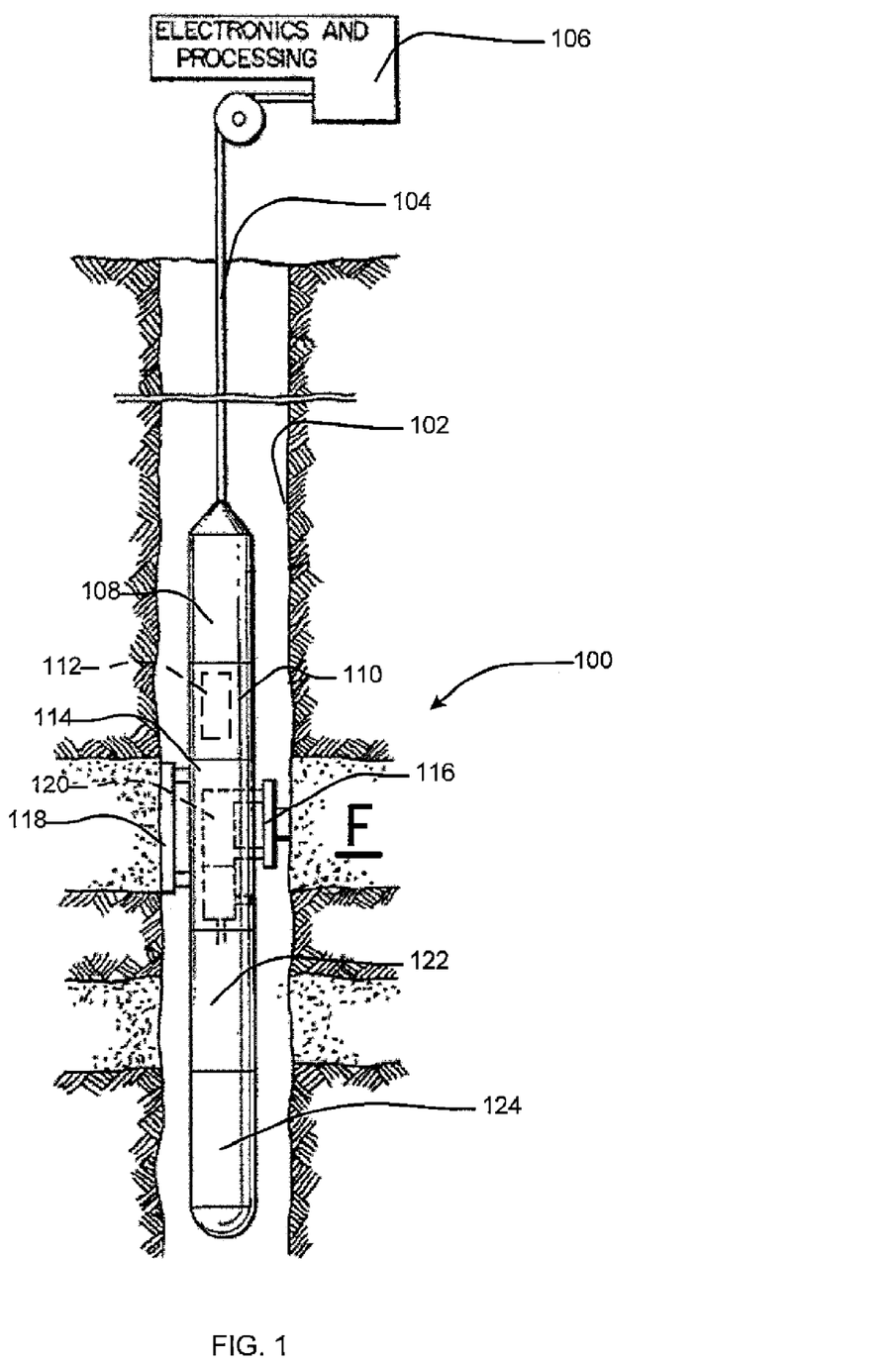
FIG. 1 depicts an example wireline tool that may be used to extract and analyze formation fluid samples and which may include a fluid resistivity measurement device having electrodes that can be monitored for the presence of a non-conductive coating using the example methods and apparatus described herein.

FIG. 1 depicts an example wireline tool 100 that may be used to extract and analyze formation fluid samples and which may include a fluid resistivity measurement device having electrodes that can be monitored for the presence of a non-conductive coating using the example methods and apparatus described herein. As shown in FIG. 1, the example wireline tool 100 is suspended in a borehole or wellbore 102 from the lower end of a multiconductor cable 104 that is spooled on a winch (not shown) at the surface. At the surface, the cable 104 is communicatively coupled to an electronics and processing system 106. The tool 100 includes an elongated body 108 that includes a collar 110 having a tool control system 112 configured to control extraction of formation fluid from the formation F and measurements (e.g., including fluid resistivity measurements) performed on the extracted fluid.

The example wireline tool 100 also includes a formation tester 114 having a selectively extendable fluid admitting assembly 116 and a selectively extendable tool anchoring member 118 that are respectively arranged on opposite sides of the body 108. The fluid admitting assembly 116 is configured to selectively seal off or isolate selected portions of the wall of the wellbore 102 to fluidly couple the adjacent formation F and draw fluid samples from the formation F. The formation tester 114 also includes a fluid analysis module 120 through which the obtained fluid samples flow. The fluid may thereafter be expelled through a port (not shown) or it may be sent to one or more fluid collecting chambers 122 and 124, which may receive and retain the formation fluid for subsequent testing at the surface or a testing facility.

In the illustrated example, the electronics and processing system 106 and/or the downhole control system 112 are configured to control the fluid admitting assembly 116 to draw fluid samples from the formation F and to control the fluid analysis module 120 to measure the fluid samples. In some example implementations, the fluid analysis module 120 may be configured to analyze the measurement data of the fluid samples as described herein. In other example implementations, the fluid analysis module 120 may be configured to generate and store the measurement data and subsequently communicate the measurement data to the surface for subsequent analysis at the surface. Although the downhole control system 112 is shown as being implemented separate from the formation tester 114, in some example implementations, the downhole control system 112 may be implemented in the formation tester 114.

As described in greater detail below, the example wireline tool 100 may be used in conjunction with the example methods and apparatus to determine the presence of a non-conductive coating on electrodes of a fluid resistivity measurement device described herein. For example, the formation tester 114 may include a fluid resistivity measurement device in a flowline and may be controlled by one or both of the downhole control system 112 and the electronics and processing system 106 to measure the resistivity of fluid samples extracted from, for example, the formation F. In addition, in accordance with the example methods and apparatus described herein, the formation tester 114 may monitor an electrical parameter (e.g., an electrical potential along an insulator between electrodes) of the fluid resistivity measurement device to determine or detect the presence of an insulating or non-conductive coating (e.g., WBM, oil, etc.) on one or more of the electrodes.

While the example methods and apparatus to determine the presence of a non-conductive coating on electrodes of a fluid resistivity measurement device are described in connection with a wireline tool such as that shown in FIG. 1, the example methods and apparatus can be implemented with any other type of wellbore conveyance. For example, the example methods and apparatus can be implemented with a drill string including LWD and/or measurement-while-drilling (MAD) modules, coiled tubing, etc.

Figure 2:
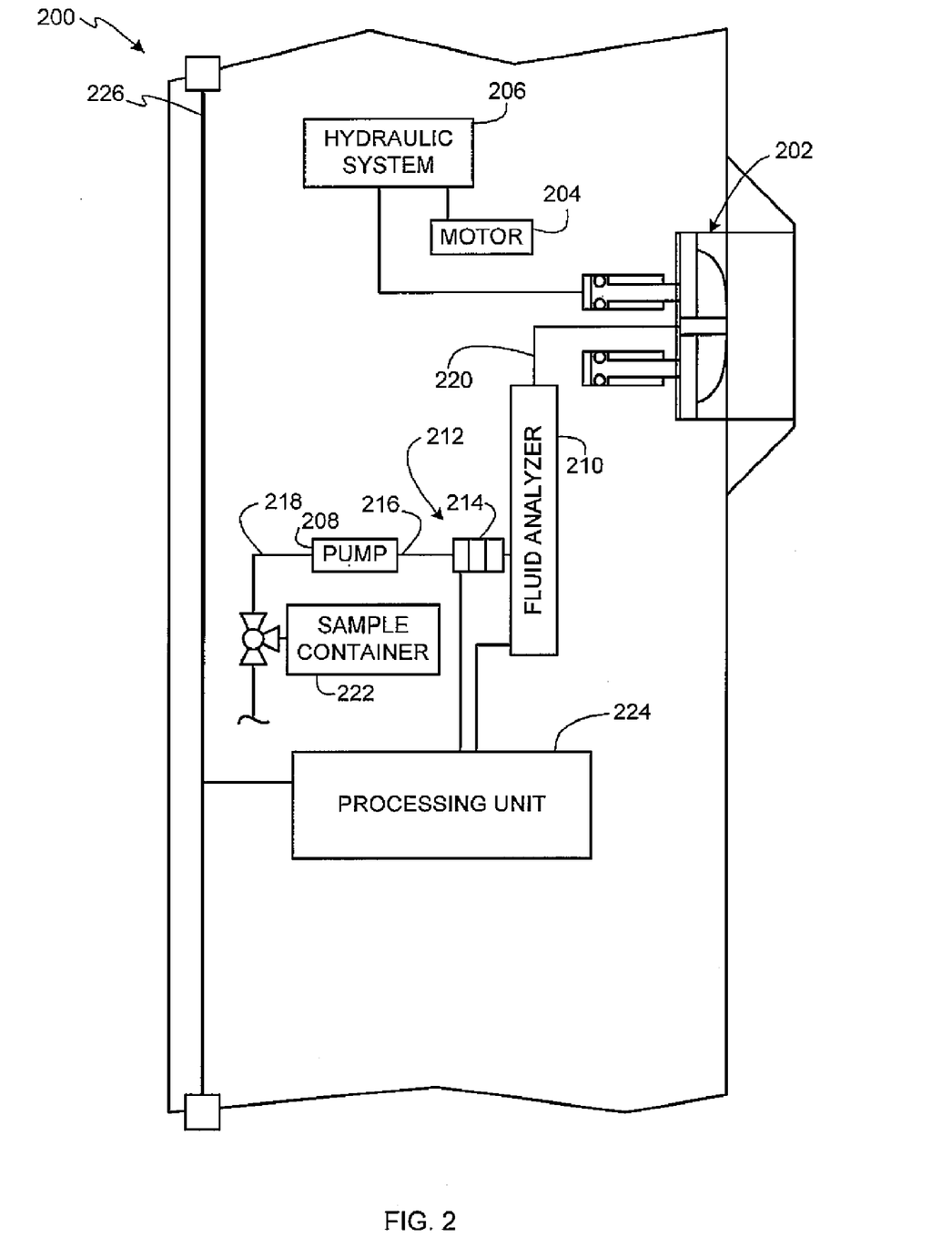
FIG. 2 is a simplified schematic illustration of an example manner in which the formation tester of FIG. 1 may be implemented.

FIG. 2 is a simplified schematic illustration of an example formation sampling tool 200 that may be used to implement the formation tester 114 of FIG. 1. The example formation sampling tool 200 includes a probe assembly 202 that can be selectively engaged to a surface of a wellbore via a motor 204 and a hydraulic system 206 to draw fluids from a formation. In other example implementations, straddle packers (not shown) can additionally or alternatively be used to engage and isolate a portion of the surface of the wellbore to draw fluids from a formation. The formation sampling tool 200 is also provided with a pump 208 that may be used to draw fluids from a formation into the tool 200.

The formation sampling tool 200 includes one or more fluid sensors to measure characteristics of the fluids drawn into the tool 200. More specifically, in the illustrated example, the formation sampling tool 200 is provided with a fluid analyzer 210 to measure one or more characteristics of formation fluids. The fluid analyzer 210 may be implemented using, for example, a light absorption spectrometer having a plurality of channels, each of which may correspond to a different wavelength. Thus, the fluid analyzer 210 may be used to measure spectral information for fluids drawn from a formation. Such spectral information may include characteristic values such as optical density values associated with each of the channels and may be used, for example, to determine the composition of the fluid(s).

The tool 200 is also provided with one or more sensors 212 to measure pressure, temperature, density, fluid resistivity, viscosity, and/or any other fluid properties or characteristics. In this example, at least one of the sensors 212 is a fluid resistivity sensor or measurement device 214 capable of measuring the resistivity of sample fluids drawn into the tool 200. In the example described herein, the fluid resistivity measurement device 214 is implemented as an inductive type fluid resistivity measurement device and, thus, includes electrodes that are separated or spaced apart along a flowline 216 by an insulator or insulating portion of the flowline 216. Various electrode and insulator configurations may be used to implement the fluid resistivity measurement device 214 such as those described in U.S. Pat. No. 7,183,778, which is assigned to the assignee of the present patent, and which is hereby incorporated by reference herein in its entirety. While the sensors 212 are depicted as being in-line with the flowline 216, one or more of the sensors 212 may be used in other flowlines 218 and 220 within the example tool 200. The tool 200 may also include a fluid sample container or store 222 including one or more fluid sample chambers in which formation fluid(s) recovered during sampling operations can be stored and brought to the surface for further analysis and/or confirmation of downhole analyses.

Figure 7:
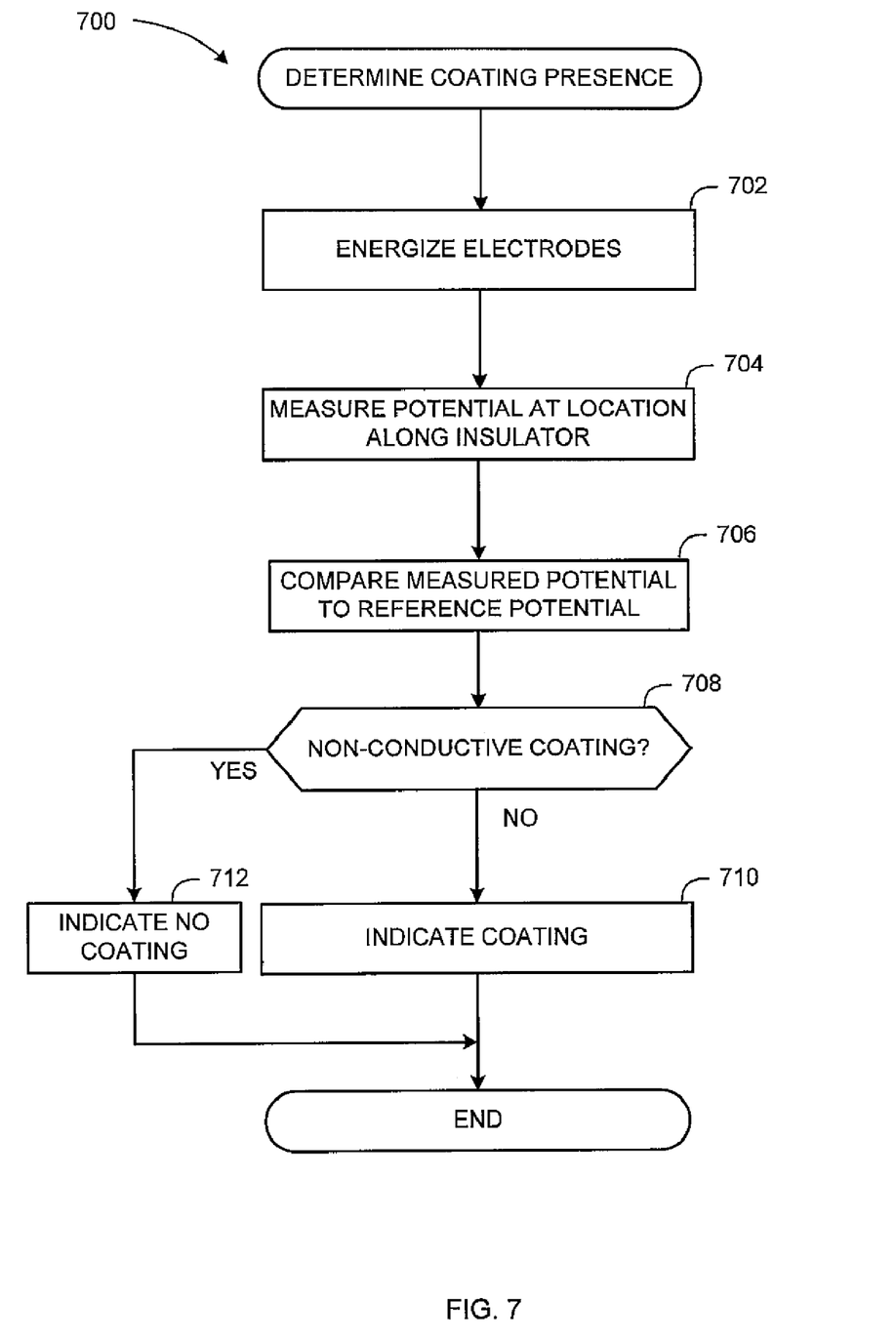
FIG. 7 is a flowchart depicting an example method of determining the presence of a non-conductive coating on one or more electrodes of a fluid resistivity measurement device.
Figure 8:
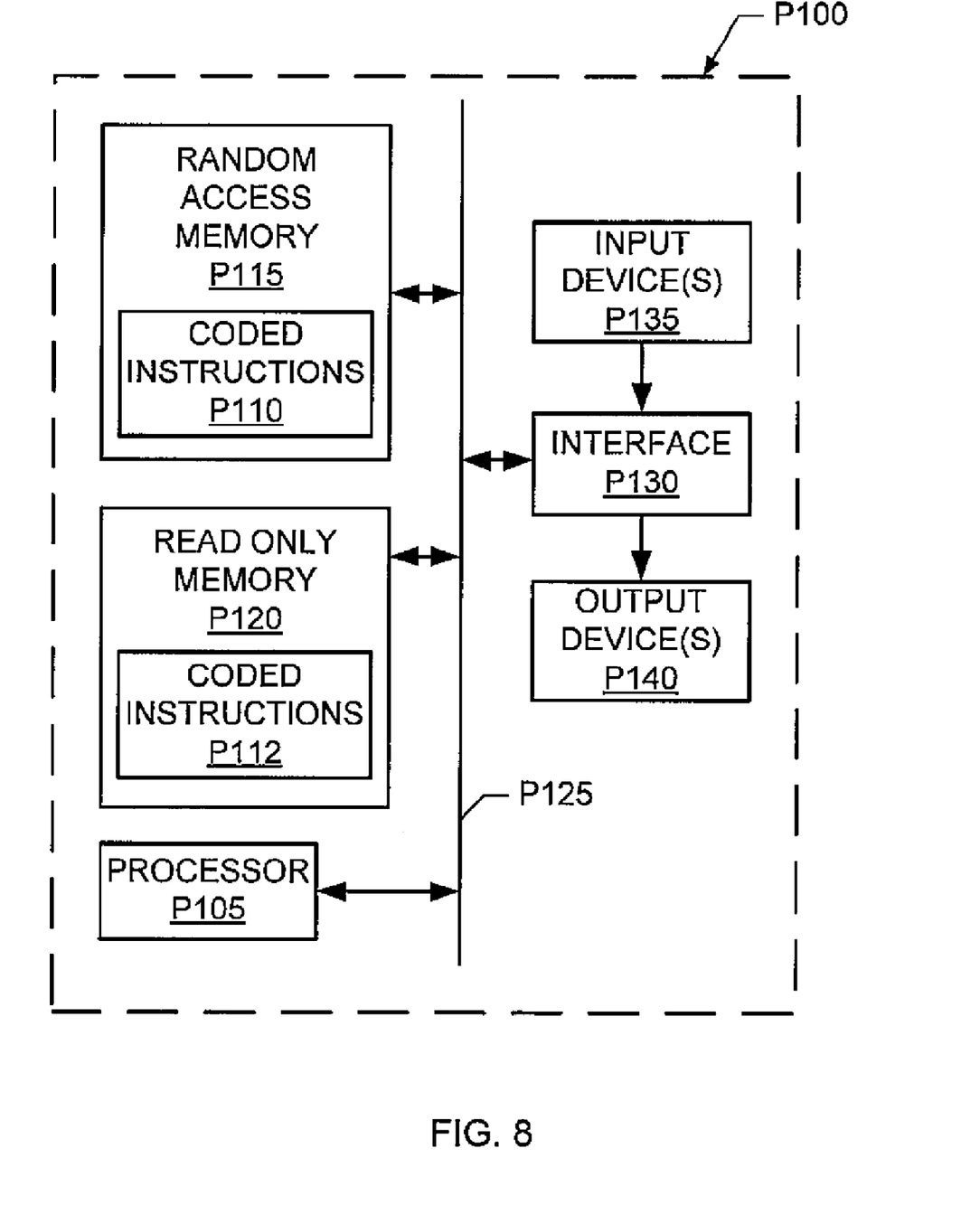
FIG. 8 is a schematic illustration of an example processor platform that may be used and/or programmed to implement any of all of the example methods and apparatus described herein.

To store, analyze and/or process test and measurement data (or any other data acquired by the formation sampling tool 200), the tool 200 is provided with a processing unit 224, which may be generally implemented as shown in FIG. 8. In the illustrated example, the processing unit 224 may include a processor (e.g., a CPU and random access memory such as shown in FIG. 8) to control operations of the tool 200 and implement measurement routines. For example, the processing unit 224 may be used to control the fluid analyzer 210 to perform spectral measurements of fluid characteristics of formation fluid, to determine or detect the presence of a non-conductive coating on the electrodes of the fluid resistivity measurement device 214 as described in connection with FIGS. 3-7 below, etc. The processing unit 224 may further include any combination of digital and/or analog circuitry needed to interface with the sensors 212 and the fluid analyzer 210. For example, the processing unit 224 includes circuitry to measure electrical potentials (e.g., voltages) associated with a location along an insulator separating the electrodes of the fluid resistivity measurement device 214.

To store machine readable instructions (e.g., code, software, etc.) that, when executed by the processing unit 224, cause the processing unit 224 to implement measurement processes or any other processes described herein, the processing unit 224 may be provided with an electronic programmable read only memory (EPROM) or any other type of memory (not shown). In particular, the processing unit 224 is configured to determine or detect the presence of an electrically insulating or non-conductive coating on one or more electrodes of the fluid resistivity measurement device 214. More specifically, the processing unit 224 may perform the example process depicted in FIG. 7 by measuring an electrical potential (e.g., a voltage) via one or more probes at a location along an insulator between electrodes of the fluid resistivity measurement device 214 and comparing that measured electrical potential to an electrical potential value (e.g., a reference potential value) associated with a substantially uncoated condition of the electrodes or a potential measured at another location along the insulator. Then, based on the comparison, the processing unit 224 may indicate the presence or absence of a non-conductive coating on the electrodes, thereby indicating whether resistivity measurements made by the fluid resistivity measurement device 214 can be considered sufficiently accurate. To communicate information (e.g., the presence of a non-conductive coating on one or more of the electrodes of the fluid resistivity measurement device 214 ) when the tool 200 is downhole, the processing system 224 is communicatively coupled to a tool bus 226, which may be communicatively coupled to a surface system (e.g., the electronics-and processing system 106 ).

Although the components of FIG. 2 are shown and described above as being communicatively coupled and arranged in a particular configuration, the components of the formation sampling tool 200 can be communicatively coupled and/or arranged differently than depicted in FIG. 2 without departing from the scope of the present disclosure. For example, the fluid analyzer 210 can be located in positions or configurations such as between the pump 208 and the sample container 222, or in any other position or configuration. In addition, the example methods and apparatus described herein are not limited to a particular conveyance type but, instead, may be implemented in connection with different conveyance types including, for example, coiled tubing, wireline, wired-drill-pipe, and/or other conveyance means known in the industry.

Figure 3:
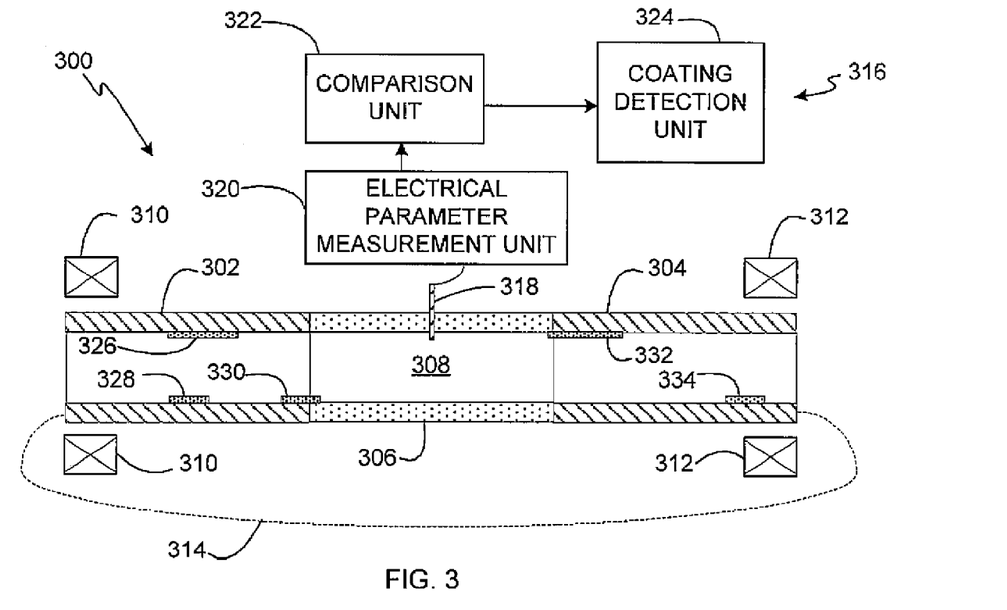
FIG. 3 is partial cross-sectional view of an example fluid resistivity measurement device that may be used to implement the fluid resistivity measurement device of FIG. 2.

FIG. 3 is partial cross-sectional view of an example fluid resistivity measurement device 300 that may be used to implement the fluid resistivity measurement device 214 of FIG. 2. The example fluid resistivity measurement device 214 is an inductive type resistivity measurement device and, thus, includes electrodes 302 and 304 that are spaced or electrically insulated from each other by an insulator or insulating portion of flowline 306, which is disposed between the electrodes 302 and 304. The electrodes 302 and 304 and the insulator 306 form a part of a flowline (e.g., the flowline 216 of FIG. 2) and, thus, provide a passageway 308 through which fluid(s) drawn from a formation (e.g., the formation F of FIG. 1) can flow and contact the electrodes 302 and 304 and the insulator 306. A transmitting torroidal transformer 310 surrounds the electrode 302 and a receiving torroidal transformer 312 surrounds the electrode 304. Energizing the transmitting torroidal transformer 310 with an alternating current induces an alternating current that flows along the longitudinal axis of the passageway 308 through the electrode 302, any sample fluid present in the passageway 308 through the insulator 306, the electrode 304, and back to the electrode 302 via a return path 314. The fluid resistivity is therefore deduced from the resistance of the volume of fluid over the dimension of the insulator 306 between the two electrodes 302 and 304. The resistivity measurement device 300 of FIG. 3 is presented as a simplified schematic diagram for purposes of clarity. However, various more detailed manners of implementing the electrodes 302 and 304, the insulator 306 and measuring fluid resistivity thereby can be found in, for example, U.S. Pat. No. 7,183,778, which has been incorporated herein by reference.

In accordance with the example methods and apparatus herein, an example non-conductive coating presence determination or detection apparatus 316 is coupled to the fluid resistivity measurement device 300. The non-conductive coating presence detection apparatus 316 is configured to measure or monitor an electrical parameter value of the fluid resistivity measurement device 300, compare the measured electrical parameter value to an electrical parameter value (e.g., an expected value or reference value) associated with a substantially uncoated condition of the electrodes 302 and 304 and, based on the comparison, indicate the presence (or absence) of a non-conductive coating on one or both of the electrodes 302 and 304.

Turning in more detail to FIG. 3, the non-conductive coating presence detection apparatus 316 includes a measurement probe or contact 318, an electrical parameter measurement unit 320, a comparison unit 322, and a coating detection unit 324. The measurement probe or contact 318 may be a conductive pin-type probe or contact that extends into the insulator 306 and into the flowline passageway 308 to be positioned to contact any fluid therein to conduct an electrical potential (e.g., a voltage) at a location along the insulator 306 to the electrical parameter measurement unit 320. While the measurement probe or contact 318 is depicted as a single pin-type probe, two or more such probes or contacts may be distributed about the outer surface of the insulator 306 and substantially aligned along a plane transverse to the longitudinal axis of the insulator 306. Any such probes or pins may be sealed to the insulator 306 to prevent the leakage of fluid in the passageway 308 out of the flowline associated with the passageway 308. Alternatively or additionally, any such probes or pins may be pressure-balanced to facilitate the prevention of fluid in the passageway 308 from leaking. Also, alternatively, the measurement probe or contact 318 can be implemented as a substantially continuous annular ring or band located on an inner wall of the insulator 306 or otherwise configured to electrically contact any fluid within the passageway 308 rather than multiple discrete probes or contacts.

Regardless of the particular manner in which the measurement probe or contact 318 is implemented, the probe or contact 318 may be located at a location along the insulator 306 associated with an electrical null. For example, if the electrodes 302 and 304 are symmetric (i.e., have the same dimensions, geometry, etc.) as shown in FIG. 3, placing the probe 318 at a location midway along the length of the insulator 306 will result in the probe 318 measuring an electrical null point during excitation of the electrodes 302 and 304. More specifically, the rotational symmetry of the electrodes 302 and 304 and the insulator 306 enables the potential within the passageway 308 to be expressed using the Laplace equation set forth below.

$$\frac{\partial^2}{\partial r^2}V(r,z) + \frac{1}{r}\frac{\partial}{\partial r}V(r,z) + \frac{\partial^2}{\partial z^2}V(r,z) = 0$$

Thus, if the electrode 302 is energized using an alternating current voltage signal $+V_o \sin(\omega t+\phi)$ and the electrode 304 is energized using a voltage signal $-V_o \sin(\omega t+\phi)$, at the midpoint along the insulator 306 (i.e., the plane z=0 along the longitudinal axis of the insulator 306), the expected measured voltage is substantially zero volts (i.e., an electrical null point).

While the electrodes 302 and 304 are substantially symmetric in geometry, an accumulation of any insulating or non-conductive coating(s) on their inner surfaces can increase the resistivity measured by the resistivity measurement device 300. In other words, the accumulation of any non-conductive fluid(s) (i.e., the deposit of a non-conductive coating) will cause the resistivity values measured by the device 300 to be higher than the actual resistivity of the fluid in the passageway 308 because the accumulated non-conductive coating effectively increases (or at least appears to increase) the size or dimensions of the insulator 306. Thus, the resistivity value measured by the resistivity measurement device 300 is dependent on the size or dimensions of the insulator 306 and any increase in the resistivity resulting from the accumulation of a non-conductive coating on one or both of the electrodes 302 and 304.

Additionally, the accumulation of any insulating or non-conductive coating(s) on one or both of the electrodes 302 and 304 can change the effective sensing volume and effectively move the point at which an electrical null exists. In other words, if the probe or contact 318 is initially located at an electrical null point along the insulator 306 when the electrodes 302 and 304 are in a substantially uncoated or clean condition, any asymmetric distribution of non-conductive deposits 326-334 coating the inside of the electrodes 302 and 304 will cause the resistivity to either side of the initial electrical null point to become unbalanced or unequal and the electrical potential (e.g., the voltage) measured at that initial electrical null point (e.g., mid-way along the length of the insulator 306) to become substantially non-zero, thereby indicating the presence of the non-conductive coating(s) 326-334. A symmetric deposit of non-conductive coating(s) on both electrodes 302 and 304 is extremely unlikely and, therefore, it is extremely unlikely that, in practice, the presence of a non-conductive coating on the electrodes 302 and 304 will not be detectable via a change in the electrical potential as outlined above.

While the electrical null point is described as being mid-way along the length of the insulator 306, in practice, due to non-ideal properties (e.g., imperfect symmetry) of the insulator 306 and/or the electrodes 302 and 304, the electrical null point may deviate somewhat from exactly mid-way along the length of the insulator 306. In that case, the contact or probe 318 can be placed at the actual electrical null point by energizing the electrodes 302 and 304 while in a substantially uncoated condition and moving the probe location until an electrical potential of substantially zero volts is measured by the electrical parameter measurement unit 320 and then fixing the probe 318 in that location. Alternatively, the probe or contact 318 can be mounted at any location along the insulator 306 and the electrical potential measured at that location when the electrodes 302 and 304 are in a substantially uncoated condition can be stored as a reference value. Then, the presence of a non-conductive coating on one or both of the electrodes 302 and 304 may be determined if subsequently measured electrical potential values deviate from the reference value. Still further, while the potentials applied to the electrodes 302 and 304 are described above as being centered about zero (e.g., 0 volts) using, for example, +V on one electrode and −V on the other, any other potential values or voltages could be used instead. For example, voltages of V1 and V2, which are centered about a non-zero value could be used to energize the electrodes 302 and 304, and the potential at the mid-point or center of the length of the insulator 306 would be a calibrated or calculated value of Vc. In that case, the presence of a non-conductive coating on one or both of the electrodes 302 and 304 would be detected by measuring a deviation (e.g., beyond a threshold value) from the potential Vc at the probe or contact 318.

In operation, the electrical parameter measurement unit 320 is electrically coupled to any fluid(s) in the passageway 308 via the probe 318 and is configured to measure an electrical parameter value such as an electrical potential value (e.g., a voltage value) during use of the fluid resistivity measurement device 300. The electrical parameter measurement unit 320 outputs the electrical parameter value to the comparison unit 322, which compares the measured electrical parameter value to an expected or reference electrical parameter value. The comparison performed by the comparison unit 322 may include determining a difference between the measured value and the expected or reference value. The non-conductive coating presence detection unit 324 receives the comparison output or information (e.g., a difference value) from the comparison unit 322 and determines the presence of a non-conductive coating on at least one of the electrodes 302 and 304 (e.g., if the difference value exceeds or is substantially different than a predetermined threshold value). The electrical parameter measurement, comparison, and presence detection operations described herein may be performed periodically (e.g., at a certain time interval) or substantially continuously to suit the needs of a particular application.

The electrical parameter measurement unit 320, the comparison unit 322 and/or the coating detection unit 324 may be implemented within, for example, the processing unit 224 (FIG. 2), which may be implemented (at least in part) as a processor-based system such as that shown in FIG. 8. More generally, any desired combination of analog and digital circuitry, including a processor executing machine readable instructions, code, software, etc., application specific integrated circuits, discrete semiconductor components, passive components, etc. may be used to implement the functions of the electrical parameter measurement unit 320, the comparison unit 322 and/or the coating detection unit 324. Further, in some implementations, the functions of the units 320, 322, and/or 324 can be implemented entirely downhole within a tool (e.g., the tool 100 of FIG. 1), entirely uphole or at the surface (e.g., via the electronics 106 of FIG. 1), or any combination of uphole and downhole implementations.

Figure 4:
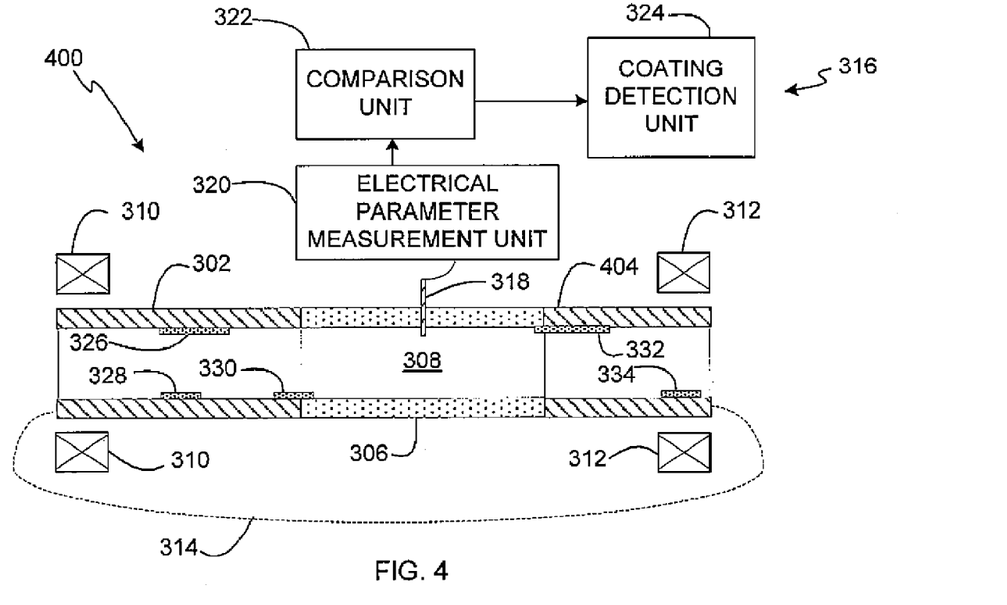
FIG. 4 is a partial cross-sectional view of another example fluid resistivity measurement device that may be used to implement the fluid resistivity measurement device of FIG. 2.

FIG. 4 is a partial cross-sectional view of another example fluid resistivity measurement device 400 that may be used to implement the fluid resistivity measurement device 214 of FIG. 2. The example device 400 is similar to the device 300 of FIG. 3 and, thus, like reference numerals correspond to similar or identical structures. However, as can be clearly seen in FIG. 4, the electrode 302 is not symmetric relative to electrode 404. Thus, locating the probe 318 at a location mid-way along the length of the insulator 306 results in a substantially non-zero expected electrical potential at that location when the electrodes 302 and 404 are in a substantially uncoated condition. In this implementation using non-symmetric electrodes, the substantially non-zero expected or reference potential value can be stored (e.g., in memory) and compared to subsequently measured electrical potential values. The presence of a non-conductive coating on one or both of the electrodes 302 and 404 can then be determined or detected when the measured electrical potential value is different than (e.g., substantially greater, substantially less than, substantially unequal to) the expected or reference value.

Figure 5:
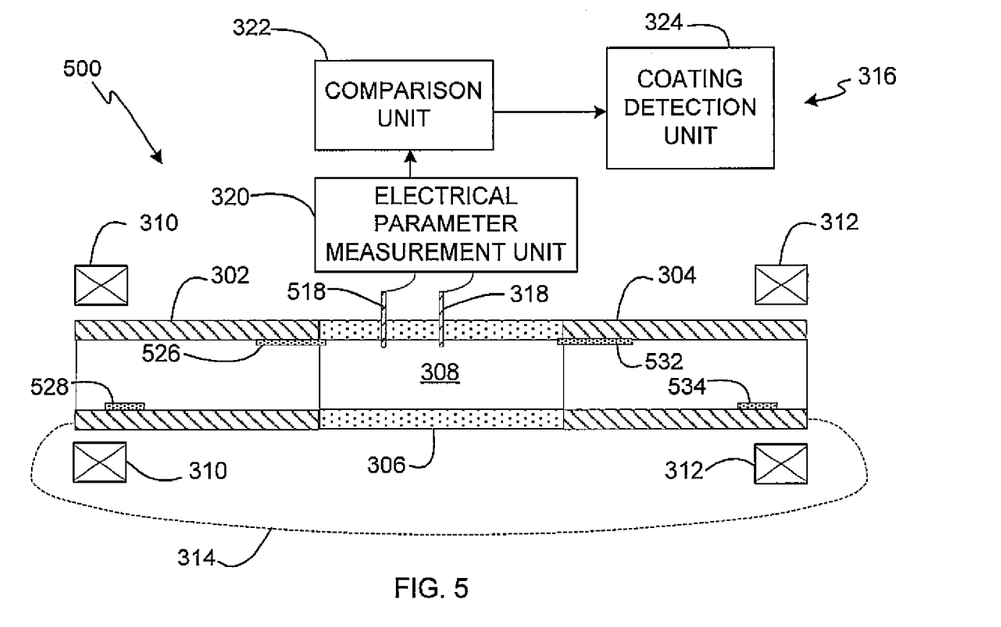
FIG. 5 is a partial cross-sectional view of another example fluid resistivity device that may be used to implement the fluid resistivity device of FIG. 2.

FIG. 5 is a partial cross-sectional view of another example fluid resistivity device 500 that may be used to implement the fluid resistivity device 214 of FIG. 2. The example device 500 is similar to the device 300 of FIG. 3 and, thus, like reference numerals correspond to similar or identical structures. However, as can be clearly seen in FIG. 5, a second probe or contact 518 is provided at a location along the insulator 306. In particular, the second probe or contact 518 is offset relative to the center or mid-point along the length of the insulator 306 to enable detection of a symmetrical non-conductive coating or arrangement of non-conductive deposits 526-534. More specifically, an arrangement of non-conductive deposits or coating that is symmetric about the mid-point along the insulator 306 is asymmetric relative to a location offset from the mid-point, thereby resulting in an electrical potential change at the offset location that can be detected or measured by the second probe or contact 518.

Figure 6:
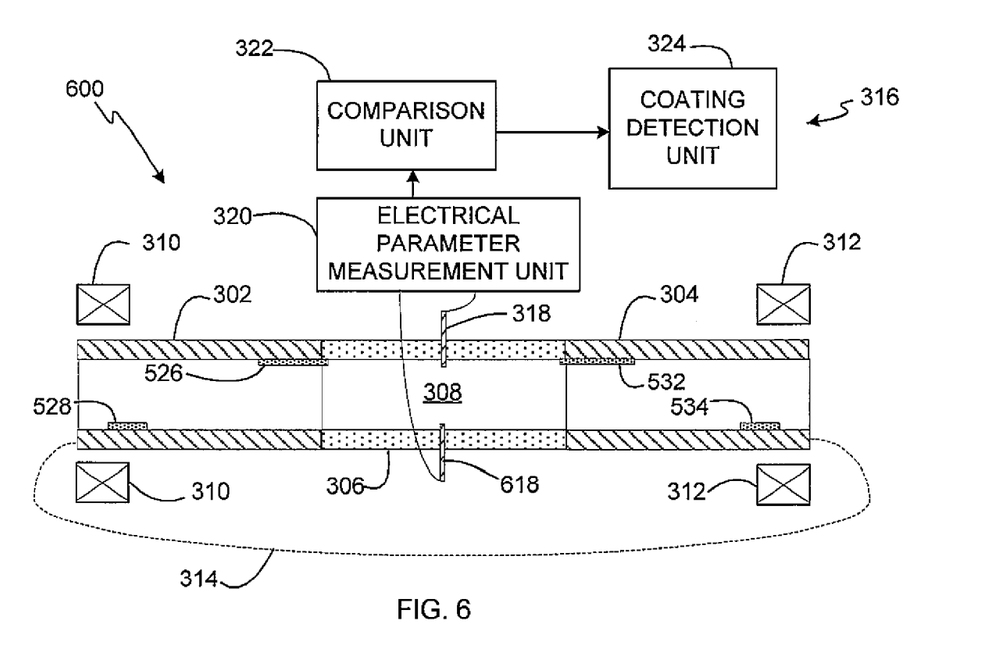
FIG. 6 is a partial cross-sectional view of another example fluid resistivity device that may be used to implement the fluid resistivity device of FIG. 2.

FIG. 6 is partial cross-sectional view of another example fluid resistivity device 600 that may be used to implement the fluid resistivity device 214 of FIG. 2. The example device 600 is similar to the device 300 of FIG. 3 and, thus, like reference numerals correspond to similar or identical structures. However, as shown in FIG. 6, a second probe or contact 618 is provided directly opposite the probe or contact 318. Thus, any asymmetry of the electrodes 302 and 304 due to the deposit of non-conductive coatings will result in different potential values being measured via each of the probes 318 and 618. As a result, the configuration of FIG. 6 enables the presence of a non-conductive coating on one or both of the electrodes 302 and 304 to be detected by comparing (e.g., determining the difference between) potential values (e.g., voltages) measured by two or more probes or contacts rather than a change in potential measured at a single probe or contact.

FIG. 7 is a flowchart depicting an example method 700 of determining the presence of a non-conductive coating on one or more electrodes of a fluid resistivity measurement device. Initially, the method 700 involves energizing electrodes (e.g., electrodes 302 and 304) of a fluid resistivity measurement device (e.g., the device 300) using, for example, a sinusoidal alternating current voltage signal as is commonly used when measuring a fluid resistivity (block 702). An electrical potential value is then measured (e.g., via the electrical parameter measurement unit 320) at a location along an insulator (e.g., the insulator 306) between the electrodes (block 704). In particular, an alternating current voltage may be measured at block 704. The electrical potential value measured at block 704 is then compared (e.g., via the comparison unit 322) to an expected or reference electrical potential value (block 706). For example, in the case where the measurement is made at an expected electrical null point, the measured electrical potential value may be compared to zero (e.g., zero volts). However, the reference potential could be a potential measured by another probe or contact at another location. The result of the comparison (e.g., a difference value) is then used to determine whether a non-conductive coating is present on one or both of the electrodes of the fluid resistivity measurement device (block 708). For example, if the magnitude of the result of the comparison exceeds a predetermined threshold value, the presence of a-non-conductive coating may be indicated (block 710). Otherwise, the absence of a non-conductive coating may be indicated (block 712).

FIG. 8 is a schematic diagram of an example processor platform P100 that may be used and/or programmed to implement all or a portion of any or all of the example operations of FIG. 7. For example, the processor platform P100 can be implemented by one or more general purpose processors, processor cores, microcontrollers, etc. The example processor platform P100, or a platform similar thereto, may be used to implement the electronics and processing system 106, the processing system unit 224, the electrical parameter measurement unit 320, the comparison unit 322, and/or the coating detection unit 324.

The processor platform P100 of the example of FIG. 8 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 6 and/or to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of determining a presence of a non-conductive coating on electrodes of a fluid resistivity measurement device, comprising:
    obtaining a first electrical potential value associated with a substantially uncoated condition of first and second electrodes of a fluid resistivity measurement device;
    measuring a second electrical potential value at a location between the first and second electrodes;
    comparing the first and second electrical potential values; and
    determining the presence of a non-conductive coating on at least one of the first and second electrodes based on the comparison.

2. The method as defined in claim 1, wherein the location is a location associated with an insulator between the first and second electrodes.

3. The method as defined in claim 2, wherein the location associated with the insulator is associated with an electrical null point between the first and second electrodes when the first and second electrodes are energized.

4. The method as defined in claim 1, wherein the first and second electrodes are symmetrical relative to each other.

5. The method as defined in claim 4, wherein the first electrical potential is substantially zero volts.

6. The method as defined in claim 1, wherein the first and second electrodes are asymmetrical relative to each other.

7. The method as recited in claim 6, wherein the first electrical potential value is a predetermined voltage.

8. The method as defined in claim 1, wherein the non-conductive coating comprises a fluid associated with at least one of a subterranean formation or a wellbore.

9. The method as defined in claim 1, wherein determining that the non-Conductive coating is present on the at least one of the first and second electrodes comprises determining that the first and second electrical potential values are not substantially equal.

10. The method as defined in claim 1, wherein the fluid resistivity measurement device is for use in measuring a resistance of a fluid in a flowline of a downhole tool.

11. The method as defined in claim 1, wherein the first and second electrical potential values are alternating current voltages.

12. A method of determining a presence of a non-conductive coating on an electrode of a fluid resistivity measurement device, comprising:
   measuring an electrical parameter value at a location between first and second electrodes of a fluid resistivity measurement device, wherein the fluid resistivity measurement device is for use in measuring a resistance of a fluid in a flowline of a downhole tool;
   comparing the measured electrical parameter value to a second electrical parameter value, wherein the second electrical parameter value is obtained by measuring an electrical potential at a second location opposite the location between the first and second electrodes; and
   determining the presence of a non-conductive coating on at least one of the first and second electrodes based on the comparison.

13. The method as defined in claim 12, wherein the second electrical parameter value is associated with a substantially uncoated condition of the first and second electrodes.

14. A method as defined in claim 12, wherein the non-conductive coating is associated with at least one of a formation fluid or a wellbore fluid.

15. The method as defined in claim 12, wherein the location is along an electrical insulator that electrically insulates the first electrode from the second electrode.

16. The method as defined in claim 12, wherein the measured electrical parameter value is a voltage value.

17. The method as defined in claim 12, wherein the second electrical parameter value is substantially zero volts when the first and second electrodes are symmetrical relative to each other and substantially greater or less than zero volts when the first and second electrodes are asymmetrical relative to each other.

18. An apparatus to determine a presence of a non-conductive coating on an electrode of a fluid resistivity measurement device, comprising:
   an electrical parameter measurement unit to measure a first electrical parameter value at a location between first and second electrodes of a fluid resistivity measurement device, wherein the fluid resistivity measurement device is for use in measuring a resistance of a fluid in a flowline of a downhole tool;
   a comparison unit to compare the first electrical parameter value to a second electrical parameter value;
   a non-conductive coating presence detection unit to determine the presence of a non-conductive coating on at least one of the first and second electrodes based on an output of the comparison unit; and
   a contact at the location and along an electrically insulated portion of the flowline between the first and second electrodes, wherein the contact is to measure the first electrical parameter value and to be electrically coupled to a fluid in the flowline and the electrical parameter measurement unit.

19. The apparatus as defined in claim 14, wherein at least one of the electrical parameter measurement unit, the comparison unit, or the non-conductive coating presence detection unit is disposed in a downhole tool.

20. The apparatus as defined in claim 18, wherein the electrical parameter measurement unit is electrically coupled to an electrical probe or contact on an insulator between the first and second electrodes.

21. The apparatus as defined in claim 18, wherein the electrical parameter measurement unit is to measure an electrical potential value at the location between the first and second electrodes.

22. The apparatus as defined in claim 21, wherein the electrical potential value is an alternating current voltage.

23. The apparatus as defined in claim 18, wherein the location is associated with an electrically null location when the first and second electrodes are in a substantially uncoated condition.

24. The apparatus as defined in claim 18, wherein the non-conductive coating presence detection unit indicates the presence of the non-conductive coating in response to the output of the comparison unit indicating that the first electrical parameter value is different than the second electrical parameter value.

25. The apparatus as defined in claim 18, further comprising a second contact along the electrically insulated portion of the flowline between the first and second electrodes, wherein the second contact is to measure the second electrical parameter value and to be electrically coupled to the fluid in the flowline and the electrical parameter measurement unit.

26. The apparatus as defined in claim 25, wherein the second contact is opposite the contact at the location.

* * * * *